(12) United States Patent
Jian et al.

(10) Patent No.: US 11,165,381 B2
(45) Date of Patent: Nov. 2, 2021

(54) SPEED CONTANT CONTROL AND POWER CONSTANT CONTROL OF A PERMANENT MAGNET SYNCHRONOUS MOTOR

(71) Applicant: Infineon Technologies Austria AG, Villach (AT)

(72) Inventors: Long Fei Jian, Shaanxi (CN); Toshio Takahashi, Rancho Palos Verdes, CA (US)

(73) Assignee: Infineon Technologies Austria AG

(*) Notice: Subject to any disclaimer, the term of this patent is extended or adjusted under 35 U.S.C. 154(b) by 0 days.

(21) Appl. No.: 16/697,481

(22) Filed: Nov. 27, 2019

(65) Prior Publication Data
US 2021/0159828 A1 May 27, 2021

(51) Int. Cl.
*H02P 21/10* (2016.01)
*H02P 21/16* (2016.01)
*H02P 21/22* (2016.01)

(52) U.S. Cl.
CPC .............. *H02P 21/10* (2013.01); *H02P 21/16* (2016.02); *H02P 21/22* (2016.02);
(Continued)

(58) Field of Classification Search
CPC ..... G05B 19/0426; G05B 11/01; G06F 17/00; G06F 19/00; G06F 9/45; H02P 5/00; H02P 6/00; H02P 4/00
See application file for complete search history.

(56) References Cited

U.S. PATENT DOCUMENTS

| | | | |
|---|---|---|---|
| 2003/0052640 A1* | 3/2003 | Iwaji | H02P 6/21 318/700 |
| 2007/0108932 A1* | 5/2007 | Takahashi | G05B 19/0426 318/568.13 |

(Continued)

FOREIGN PATENT DOCUMENTS

| | | |
|---|---|---|
| EP | 3361625 A1 | 8/2018 |
| EP | 2264887 B1 | 7/2020 |

(Continued)

OTHER PUBLICATIONS

Intineon Technologies AG, iMOTION™ Motion Control Engine Software Reference Manual, [online], Jun. 5, 2019, vol. 1.2, pp. 1-152, URL: <https://www.infineon.com/dgdl/Infineon-MCESW-RM-UM-v01_00-EN.pdf?fileId=5546d4626176435901618999d79a4202>.

*Primary Examiner* — Said Bouziane
(74) *Attorney, Agent, or Firm* — Design IP

(57) ABSTRACT

A motor controller includes a current controller configured to generate control signals for driving a permanent magnet synchronous motor (PMSM), where the current controller is configured to measure voltage information and current information of the PMSM; a power constant controller configured to receive the voltage information and the current information, and generate a first target speed based on a target power of the PMSM and based on the voltage information and the current information; first signal generator configured to generate a second target speed; a speed constant controller coupled between the power constant controller and the current controller, wherein the speed constant controller is configured to switchably receive the first target speed and the second target speed, and regulate a motor speed of the PMSM based on the received first target speed or the received second target speed.

20 Claims, 7 Drawing Sheets

(52) U.S. Cl.
CPC ...... *H02P 2205/01* (2013.01); *H02P 2205/03* (2013.01); *H02P 2205/07* (2013.01)

(56) References Cited

U.S. PATENT DOCUMENTS

| | | | |
|---|---|---|---|
| 2009/0026988 A1* | 1/2009 | Tomigashi | H02P 21/141 |
| | | | 318/400.02 |
| 2010/0148707 A1* | 6/2010 | Tobari | H02P 21/22 |
| | | | 318/400.02 |
| 2017/0250628 A1* | 8/2017 | Tian | G06F 17/11 |
| 2019/0190421 A1* | 6/2019 | Shigeta | H02P 27/12 |
| 2020/0007058 A1* | 1/2020 | Xu | H02P 21/0089 |
| 2020/0343844 A1* | 10/2020 | Shouji | H02P 21/24 |
| 2020/0358382 A1* | 11/2020 | Lan | H02P 6/08 |

FOREIGN PATENT DOCUMENTS

| | | |
|---|---|---|
| JP | 2004147430 A | 5/2004 |
| JP | 2015109771 A | 6/2015 |
| WO | 2016067665 A1 | 5/2016 |

* cited by examiner

SPEED CONTANT CONTROL AND POWER CONSTANT CONTROL OF A PERMANENT MAGNET SYNCHRONOUS MOTOR

FIELD

The present disclosure relates generally to devices and to methods for implementing speed constant control and power constant control of a permanent magnet synchronous motor (PMSM), and more particularly to a PMSM with sensorless Field Oriented Control (FOC).

BACKGROUND

Motor control algorithms, implementing either a speed constant control or a power constant control, are used by a motor controller for controlling a permanent magnet synchronous motor (PMSM). A PMSM may be used in fan motors, such as those used in vacuum cleaners, exhaust fans, oil smoke extraction fans, or other similar applications. However, at least four problems exist.

First, speed constant control cannot sustain constant air flow of a fan when an air inlet has changed. For example, an air inlet to a vacuum cleaner may become partially or fully blocked.

Second, speed constant control cannot protect a battery power supply of the motor because the speed is kept constant and the motor power will increase quickly if the load increases. The load may increase, for example, in response to the air inlet being opened further than during regular operation.

Third, a frequency width of a general power constant control is usually narrow. As a result, the dynamic response is slow. If a quick motor start up is needed, as is the case for vacuum cleaners, power constant control may not be able to meet this requirement since the start-up speed will be too slow.

Fourth, general power constant control only controls the motor power, which is also the output power of the inverter. However, it cannot reflect the input power to protect the battery supply.

Therefore, an improved device having power constant control realized in a PMSM with sensorless Field Oriented Control (FOC) that can address these issues may be desirable.

Additionally, an issue occurs in the application of vacuum cleaners and other suction devices when the inlet of vacuum cleaner or suction device is blocked by one or more objects. A blocked inlet will bring about many other problems, including burning out the motor and the circuit board, as these will reach high temperatures without an effective cooling air flow. In addition, dust, dirt, etc. cannot be vacuumed without air flow.

Therefore, an improved device having power constant control with the additional ability to remove inlet blockages automatically (i.e., without user intervention) during run-time of the motor may be desired.

SUMMARY

One or more embodiments provide a motor controller configured to drive a permanent magnet synchronous motor (PMSM) with sensorless Field Oriented Control (FOC). The motor controller includes a current controller configured to generate control signals for driving the PMSM, wherein the current controller is configured to measure voltage information of the PMSM and current information of the PMSM; a power constant controller configured to receive the voltage information and the current information, and generate a first target speed based on a target power of the PMSM and based on the voltage information and the current information; a first signal generator configured to generate a second target speed; a speed constant controller coupled between the power constant controller and the current controller, wherein the speed constant controller is configured to switchably receive the first target speed and the second target speed, and regulate a motor speed of the PMSM based on the received first target speed or the received second target speed; a first switch configured to switchably couple the speed constant controller to the power constant controller, to receive the first target speed, in a first switch state or to the first signal generator, to receive the second target speed, in a second switch state; and a first switch controller configured to control a switching state of the first switch.

One or more embodiments provide a method of driving a PMSM with sensorless FOC. The method includes: generating, by a current controller, control signals for driving the PMSM; measuring, by the current controller, voltage information of the PMSM and current information of the PMSM; generating, by a power constant controller, a first target speed based on a target power of the PMSM and based on the voltage information and the current information; generating, by a first signal generator, a second target speed; switchably receiving, by a speed constant controller coupled between the power constant controller and the current controller, the first target speed and the second target speed; regulating, by the speed constant controller, a motor speed of the PMSM based on the received first target speed or the received second target speed; switchably coupling, by a first switch, the speed constant controller to the power constant controller, to receive the first target speed, in a first switch state or to the first signal generator, to receive the second target speed, in a second switch state; and controlling, by a first switch controller, a switching state of the first switch.

BRIEF DESCRIPTION OF THE DRAWINGS

Embodiments are described herein making reference to the appended drawings.

DETAILED DESCRIPTION

Figure 1A:
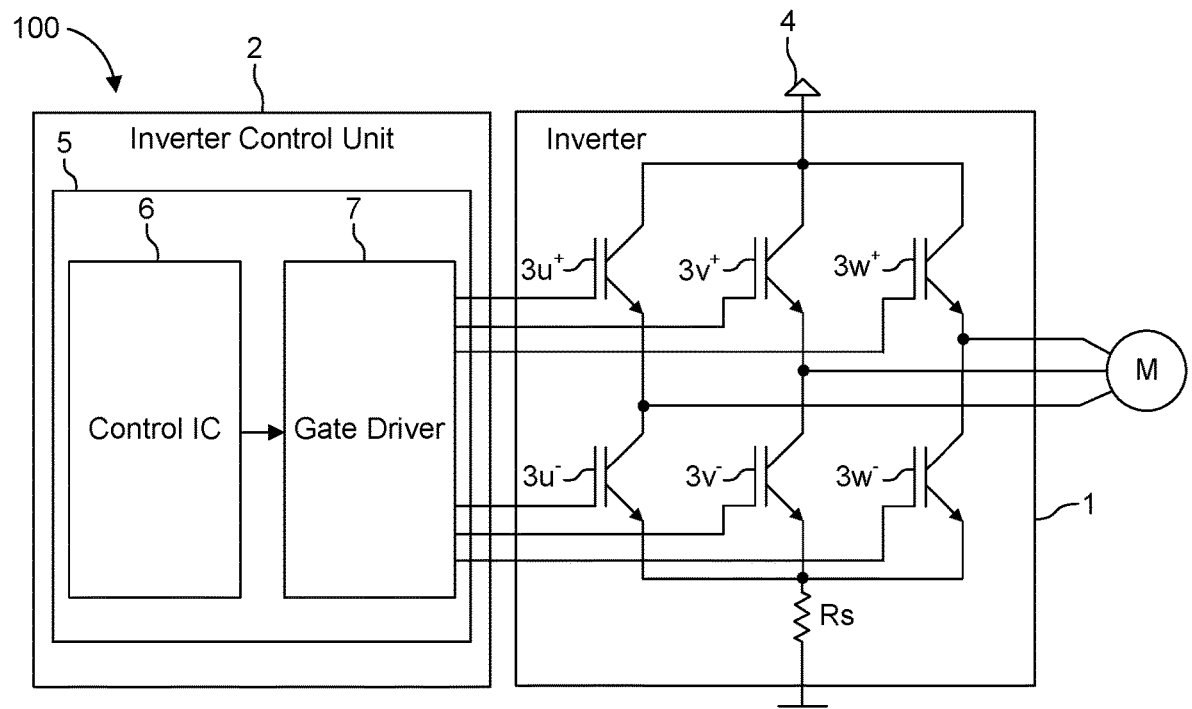
FIG. 1A is a schematic block diagram illustrating a motor control actuator of a power semiconductor device according to one or more embodiments.

In the following, details are set forth to provide a more thorough explanation of the exemplary embodiments. However, it will be apparent to those skilled in the art that embodiments may be practiced without these specific details. In other instances, well-known structures and devices are shown in block diagram form or in a schematic view rather than in detail in order to avoid obscuring the embodiments. In addition, features of the different embodiments described hereinafter may be combined with each other, unless specifically noted otherwise.

Further, equivalent or like elements or elements with equivalent or like functionality are denoted in the following description with equivalent or like reference numerals. As the same or functionally equivalent elements are given the same reference numbers in the figures, a repeated description for elements provided with the same reference numbers may be omitted. Hence, descriptions provided for elements having the same or like reference numbers are mutually exchangeable.

In this regard, directional terminology, such as "top", "bottom", "below", "above", "front", "behind", "back", "leading", "trailing", etc., may be used with reference to the orientation of the figures being described. Because parts of embodiments can be positioned in a number of different orientations, the directional terminology is used for purposes of illustration and is in no way limiting. It is to be understood that other embodiments may be utilized and structural or logical changes may be made without departing from the scope defined by the claims. The following detailed description, therefore, is not to be taken in a limiting sense.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between," "adjacent" versus "directly adjacent," etc.).

In embodiments described herein or shown in the drawings, any direct electrical connection or coupling, i.e., any connection or coupling without additional intervening elements, may also be implemented by an indirect connection or coupling, i.e., a connection or coupling with one or more additional intervening elements, or vice versa, as long as the general purpose of the connection or coupling, for example, to transmit a certain kind of signal or to transmit a certain kind of information, is essentially maintained. Features from different embodiments may be combined to form further embodiments. For example, variations or modifications described with respect to one of the embodiments may also be applicable to other embodiments unless noted to the contrary.

The term "substantially" may be used herein to account for small manufacturing tolerances (e.g., within 5%) that are deemed acceptable in the industry without departing from the aspects of the embodiments described herein.

A sensor may refer to a component which converts a physical quantity to be measured to an electric signal, for example, a current signal or a voltage signal. The physical quantity may, for example, be a current or a voltage at a shunt resistor in a single-shunt resistor system.

A signal processing circuit and/or a signal conditioning circuit may receive one or more signals from one or more components and perform signal conditioning or processing thereon. Signal conditioning, as used herein, refers to manipulating a signal in such a way that the signal meets the requirements of a next stage for further processing. Signal conditioning may include converting from analog to digital (e.g., via an analog-to-digital converter), amplification, filtering, converting, biasing, range matching, isolation and any other processes required to make a signal suitable for processing after conditioning.

Thus, a signal processing circuit may include an analog-to-digital converter (ADC) that converts the analog signal from the one or more sensor elements to a digital signal. The signal processing circuit may also include a digital signal processor (DSP) that performs some processing on the digital signal.

Many functions of modern devices in automotive, consumer and industrial applications, such as converting electrical energy and driving an electric motor or an electric machine, rely on power semiconductor devices. For example, Insulated Gate Bipolar Transistors (IGBTs), Metal Oxide Semiconductor Field Effect Transistors (MOSFETs) and diodes, to name a few, have been used for various applications including, but not limited to switches in power supplies and power converters.

A power semiconductor device usually comprises a semiconductor structure configured to conduct a load current along a load current path between two load terminal structures of the device. Further, the load current path may be controlled by means of a control electrode, sometimes referred to as gate electrode. For example, upon receiving a corresponding control signal from, e.g., a driver unit, the control electrode may set the power semiconductor device in one of a conducting state and a blocking state. A control signal may by a voltage signal or a current signal having a controlled value.

A power transistor is a power semiconductor device that may be used to drive a load current. For example, an IGBT is turned "ON" or "OFF" by activating and deactivating its gate terminal. Applying a positive input voltage signal across the gate and the emitter will keep the device in its "ON" state, while making the input gate signal zero or slightly negative will cause it to turn "OFF". There is a turn-on process and a turn-off process for switching the power transistor on and off. During the turn-on process, a gate driver integrated circuit (IC) may be used to provide (source) a gate current (i.e., an on current) to the gate of the power transistor in order to charge the gate to a sufficient voltage to turn on the device. In contrast, during the turn-off process, the gate driver IC is used to draw (sink) a gate current (i.e., an off current) from the gate of the power transistor in order to discharge the gate sufficiently to turn off the device. A current pulse may be output from the gate driver IC as the control signal according to a pulse width modulation (PWM) scheme. Thus, the control signal may be switched between an ON current level and an OFF current level during a PWM cycle for controlling a power transistor.

This in turn charges and discharges the gate voltage to turn on and off the power transistor, respectively.

In particular, the gate of a power transistor is a capacitive load, and the turn ON current (i.e., gate source current) and the turn OFF current (i.e., gate sink current) are specified as the initial current when a switching event is initiated. During a turn OFF event, after some small amount of time (small compared to the PWM period), the gate current decreases and reaches a zero value when the gate reaches 0V. During a turn ON event, after some small amount of time (small compared to the PWM period), the gate current decreases and reaches a zero value when the gate reaches 15V.

Transistors may include Insulated Gate Bipolar Transistors (IGBTs) and Metal Oxide Semiconductor Field Effect Transistors (MOSFETs) (e.g., Si MOSFETs or SiC MOSFETs). While IGBTs may be used as an example in the embodiments below, it will be appreciated that MOSFETs may be substituted for the IGBTs and vice versa. In this context, when substituting a MOSFET for an IGBT, a MOSFET's drain may be substituted for an IGBT's collector, the MOSFET's source may be substituted for the IGBT's emitter, and the MOSFETs drain-source voltage $V_{DS}$ may be substituted for the IGBT's collector-emitter voltage $V_{CE}$ in any one of the examples described herein. Thus, any IGBT module may be substituted by a MOSFET module and vice versa.

Specific embodiments described in this specification pertain to, without being limited thereto, a power semiconductor device that may be used within a power converter or a power supply. Thus, in an embodiment, the power semiconductor device may be configured to carry a load current that is to be supplied to a load and/or, respectively, that is provided by a power source. For example, the semiconductor device may comprise one or more power semiconductor cells, such as a monolithically integrated diode cell, and/or a monolithically integrated transistor cell. Such diode cell and/or such transistor cells may be integrated in a power semiconductor module.

Power semiconductor devices that include transistors which are suitably connected to form half-bridges are commonly used in the field of power electronics. For example, half-bridges may be used for driving electric motors or switched mode power supplies.

For example, a multi-phase inverter is configured to provide multi-phase power by supplying multiple phase loads (e.g., a three-phase motor). For instance, three-phase power involves three symmetrical sine waves that are 120 electrical degrees out of phase with one another. In a symmetric three-phase power supply system, three conductors each carry an alternating current (AC) of the same frequency and voltage amplitude relative to a common reference but with a phase difference of one third the period. Due to the phase difference, the voltage on any conductor reaches its peak at one third of a cycle after one of the other conductors and one third of a cycle before the remaining conductor. This phase delay gives constant power transfer to a balanced linear load. It also makes it possible to produce a rotating magnetic field in an electric motor.

In a three-phase system feeding a balanced and linear load, the sum of the instantaneous currents of the three conductors is zero. In other words, the current in each conductor is equal in magnitude to the sum of the currents in the other two, but with the opposite sign. The return path for the current in any phase conductor is the other two phase conductors. The instantaneous currents result in a current space vector.

A three-phase inverter includes three inverter legs, one for each of the three phases, and each inverter leg is connected to a direct current (DC) voltage source in parallel to each other. Each inverter leg includes a pair of transistors, for example, arranged in a half-bridge configuration for converting DC to AC. In other words, each inverter leg includes two complementary transistors (i.e., a high-side transistor and a low-side transistor) connected in series and which switch on and off complementary to the each other for driving a phase load. However, multi-phase inverters are not limited to three phases, and may include two phases or more than three phases, with an inverter leg for each phase.

FIG. 1A is a schematic block diagram illustrating a motor control actuator 100 of a power semiconductor device according to one or more embodiments. In particular, the motor control actuator 100 includes a power inverter 1 and an inverter control unit 2. The inverter control unit 2 behaves as a motor control unit and thus may also be referred to as a motor controller or a motor control IC. The motor control unit may be a monolithic IC or may be split into a microcontroller and a gate driver on two or more ICs.

The motor control actuator 100 is further coupled to a three-phase motor M, that includes three phases U, V, and W. The power inverter 1 is a three-phase voltage generator configured to provide three-phase power by supplying three phase voltages to drive the motor M. It will be further appreciated that the power inverter 1 and the inverter control unit 2 may be placed on a same circuit board, or on separate circuit boards.

Deviations in both magnitude and phase may cause a loss in power and torque in the motor M. Therefore, the motor control actuator 100 may be configured to monitor and control the magnitude and phase of the voltages supplied to the motor M in real-time to ensure the proper current balance is maintained based on a feedback control loop. Open loop motor control units also exist and may be implemented.

The power inverter 1 for a three-phase motor M includes a switching array of six transistor modules 3u+, 3u−, 3v+, 3v−, 3w+, and 3w−(collectively referred to as transistor modules 3) arranged in complementary pairs. Each complementary pair constitutes one inverter leg that supplies a phase voltage to the three-phase motor M. Thus, each inverter leg includes an upper (high-side) transistor module 3 and a lower (low-side) transistor module 3. Each transistor module may include one power transistor and may also include a diode (not illustrated). Thus, each inverter leg includes an upper transistor and a lower transistor. Load current paths U, V, and W extend from an output of each inverter leg (i.e., the output of each half-bridge) located between complementary transistors and are configured to be coupled to a load, such as motor M. The power inverter 1 is coupled to a DC power supply 4 (e.g., a battery or a diode bridge rectifier) and to the inverter control unit 2.

In this example, the inverter control unit 2 includes a motor control circuit and the gate driver circuit for controlling the switching array. In some examples, the inverter control unit 2 may be monolithic in which the motor control circuit and gate driver circuit are integrated onto a single die. In other examples, the motor control circuit and gate driver circuit may be partitioned as separate ICs. A "monolithic" gate driver is a gate driver on a single silicon chip and may be further made with specific high voltage (HV) technology. Furthermore, the gate driver IC may be integrated on the power inverter 1.

The motor controller performs the motor control function of the motor control actuator 100 in real-time and transmits PWM control signals to a gate driver. Motor control functions can include either controlling a permanent magnet motor or an induction motor and can be configured as a sensorless control not requiring the rotor position sensing, as is the case with a sensor based control with Hall sensors and/or an encoder device. Alternatively, the motor control function may include a combination of both sensor based control (e.g., used at lower rotor speeds) and sensorless control (e.g., used at higher rotor speeds).

For example, the inverter control unit 2 includes a controller and driver unit 5 that includes a microcontroller unit (MCU) 6 as the motor controller and a gate driver 7 for generating driver signals for controlling the transistors of each transistor module 3. Thus, load current paths U, V, and W may be controlled by the controller and driver unit 5 by means of controlling the control electrodes (i.e., gate electrodes) of the transistors 3. For example, upon receiving a PWM control signal from the microcontroller, the gate driver IC may set a corresponding transistor in one of a conducting state (i.e., on-state) or a blocking state (i.e., off-state).

The gate driver IC may be configured to receive instructions, including the power transistor control signals, from the microcontroller, and turn on or turn off respective transistors 3 in accordance with the received instructions and control signals. For example, during the turn-on process of a respective transistor 3, the gate driver IC may be used to provide (source) a gate current to the gate of the respective transistor 3 in order to charge the gate. In contrast, during the turn-off process, the gate driver IC may be used to draw (sink) a gate current from the gate of the transistor 3 in order to discharge the gate.

The inverter control unit 2 or the controller and driver unit 5 itself may include a PWM controller, an ADC, a DSP, and/or a clock source (i.e., a timer or counter) used in implementing a PWM scheme for controlling the states of each transistor, and, ultimately, each phase current provided on the respective load current paths U, V, and W.

In particular, the microcontroller 6 of the controller and driver unit 5 may use a motor control algorithm, such as a Field Oriented Control (FOC) algorithm, for providing current control in real-time for each phase current output to a multi-phase load, such a multi-phase motor. Thus, the field-oriented control loop may be referred to as a current control loop. Motor speed may further be controlled by adding a speed constant control loop on top of FOC control that provides speed constant control. Thus, FOC (i.e., the current control loop) may be considered as an inner control loop and a speed constant control loop may be considered as an outer control loop. In addition, motor power, and consequently motor speed, may be further controlled by a power constant control loop on top of the speed constant control loop. Thus, the power constant control loop may be considered the outermost control loop, at least with respect to the current control loop and the speed constant control loop. In other words, the current control loop may be considered as an inner control loop, a speed constant control loop may be considered as an intermediate control loop, and a power constant control loop may be considered as an outer control loop.

The current control loop and the speed constant control loop always remain activated or enabled during motor control (i.e., during runtime of the motor). Likewise, it is possible that the power constant control loop remains activated or enabled during motor control. However, it is also possible that the power constant control loop be switchably activated/deactivated (enabled/disabled) during motor control. In instances when the power constant control loop is activated, the controller and driver unit 5 is considered to be in power constant control mode, even though the speed constant control loop is also activated. In instances when the power constant control loop is deactivated, the controller and driver unit 5 is considered to be in speed constant control mode.

In some cases, motor position may be controlled using a fourth control loop (e.g., a position control loop) that is also outside of the speed constant control loop.

For example, during FOC, a motor phase current should be measured such that an exact rotor position can be determined in real-time. To implement the determination of the motor phase current, the microcontroller 6 may employ an algorithm (e.g., space vector modulation (SVM), also referred as space vector pulse width modulation (SVPWM)) that uses single-shunt current sensing.

Furthermore, the switches 3 (i.e., transistors) of the power inverter 1 are controlled so that at no time are both switches in the same inverter leg turned on or else the DC supply would be shorted. This requirement may be met by the complementary operation of the switches 3 within an inverter leg according to the motor control algorithm.

Figure 1B:
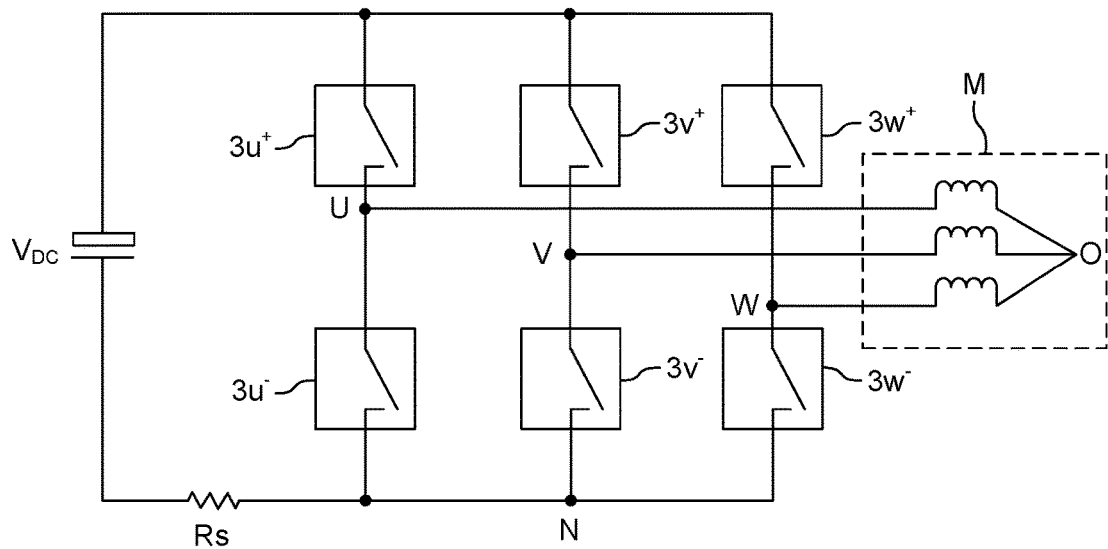
FIG. 1B is a schematic diagram illustrating a power inverter utilizing single-shunt current sensing according to one or more embodiments.

FIG. 1B is a schematic diagram illustrating a power inverter 1 utilizing single-shunt current sensing according to one or more embodiments. In particular, the power inverter 1 includes a shunt resistor Rs placed on the negative DC link of the power inverter 1. The transistors $3_{u+}$, $3_{u-}3_{v+}$, $d_{v-}$, $3_{w+}$, and $3_{w-}$ are represented as switches and the motor M is shown with a winding for each of its phases. Here, UO represents the line to neutral voltage from bridge middle point U to motor neutral point O; UN represents the U bridge voltage from bridge middle point U to the negative bus supply rail N; UV represents the line to line voltage from U phase to V phase; VW represents the line to line voltage from V phase to W phase; and WV represents the line to line voltage from W phase to V phase.

The microcontroller 6 in FIG. 1A may receive samples of the current taken from the shunt resistor Rs and then use an algorithm (i.e., software) to re-construct the three-phase current in real-time. For example, SVPWM is a vector control based algorithm that requires the sensing of the three motor phase currents. By using the single-shunt resistor Rs, DC-link current pulses are sampled at exactly timed intervals. A voltage drop on the shunt resistor Rs may be amplified by an operational amplifier inside inverter control unit 2 and shifted up, for example, by 1.65V. The resultant voltage may be converted by an ADC inside inverter control unit 2. Based on the actual combination of switches, the three-phase currents of the motor M are reconstructed using the SVPWM algorithm. The ADC may measure the DC-link current during the active vectors of the PWM cycle. In each sector, two phase current measurements are available. The calculation of the third phase current value is possible because the three winding currents sum to zero.

SVPWM itself is an algorithm for the control of PWM in real-time. It is used for the creation of AC waveforms, and may be used to drive three-phase AC powered motors at varying speeds from a DC source using multiple switching transistors. While the examples herein are described in the context of three-phase motors, the examples are not limited thereto and may be applied to any load scheme.

In addition, it will be appreciated that other implementations other than a single-shunt resistor may be used for current sensing, as well as other motor control algorithms may be used to control the load, and that the embodiments described herein are not limited thereto.

Figure 2A:
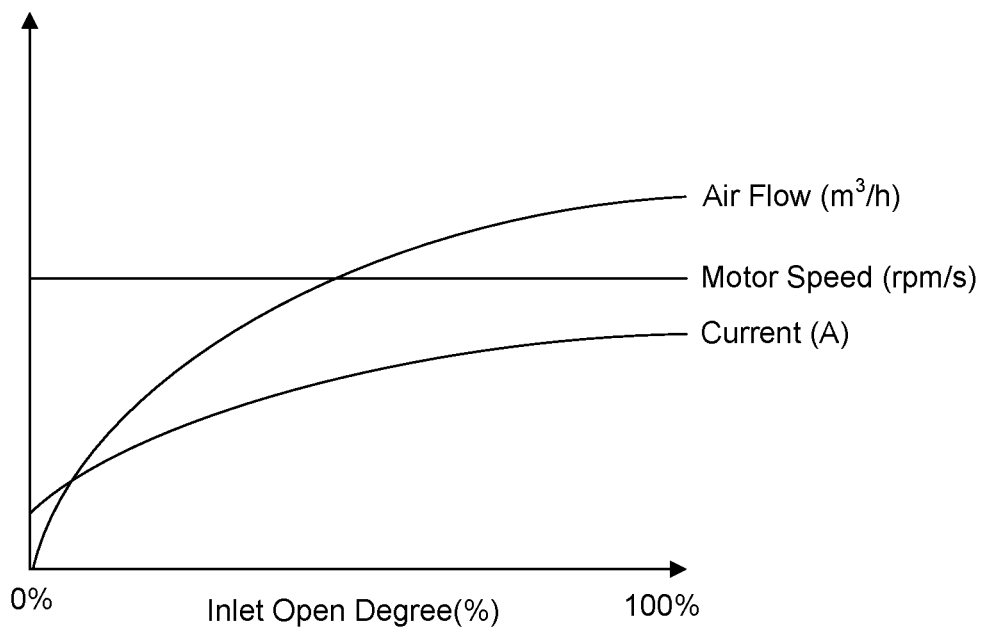
FIG. 2A is a graph illustrating speed constant control features according to one or more embodiments.

FIG. 2A is a graph illustrating speed constant control features according to one or more embodiments. Specifically, the graph illustrates arbitrary values for motor speed (rpm/s), current (A), and air flow (m³/h) relative to a degree of inlet opening (%), where 0% corresponds to the inlet being closed or blocked and 100% corresponds to the inlet being fully open or unblocked. The speed constant control maintains the motor speed at a constant value regardless of changing load, which may change in response to the air inlet being changed.

Figure 2B:
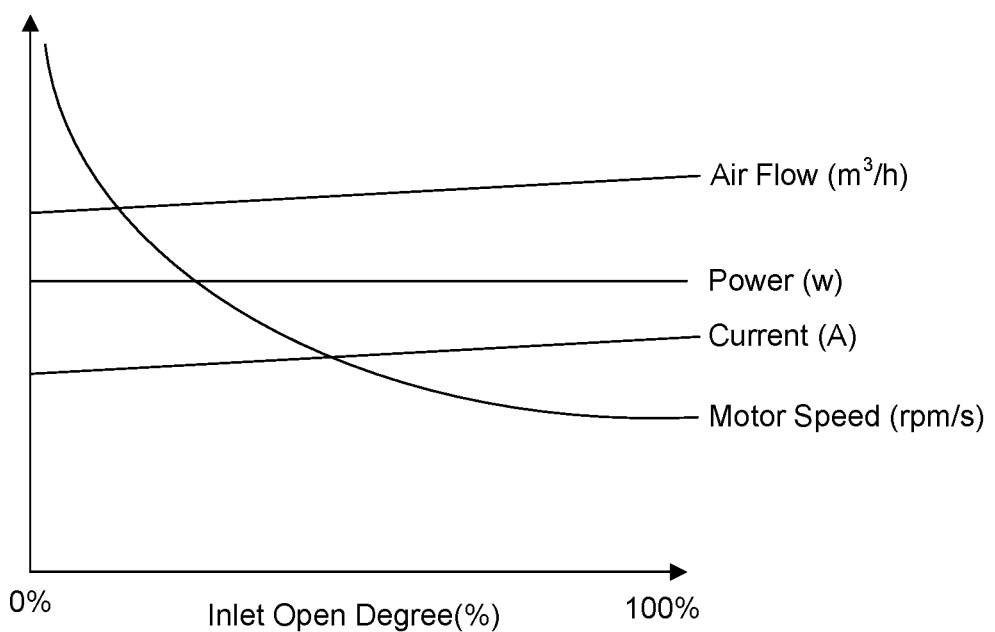
FIG. 2B is a graph illustrating power constant control features according to one or more embodiments.

FIG. 2B is a graph illustrating power constant control features according to one or more embodiments. Specifically, the graph illustrates arbitrary values for motor speed (rpm/s), current (A), power (W), and air flow (m³/h) relative to a degree of inlet opening (%), where 0% corresponds to the inlet being closed or blocked and 100% corresponds to the inlet being fully open or unblocked. The motor power is also the same as the output power of the inverter 1. The power constant control maintains the motor power at a constant value regardless of changing load, which may change in response to the air inlet being changed.

According to one or more embodiments, the air flow does not change a lot in the fan's application with power constant power control. When the air inlet is reduced, the load current will change by a smaller amount when compared to the speed constant control. Here, the power constant controller increases the output current in order to sustain constant power, then electronic torque will increase and motor speed will increase as well.

The power constant control of the described embodiments can make a target power as the input power of inverter. Thus, the power constant controller controls the input power of inverter and protects the battery. Furthermore, by combining the speed constant control and power constant control, in the manner described herein, speed constant control may be used to realize fast motor start-up as the motor starts up and the control mode may be switched by the motor controller to the power constant control once the motor reaches a predetermined "normal" speed at the selected target power.

Figures 1, 3A:
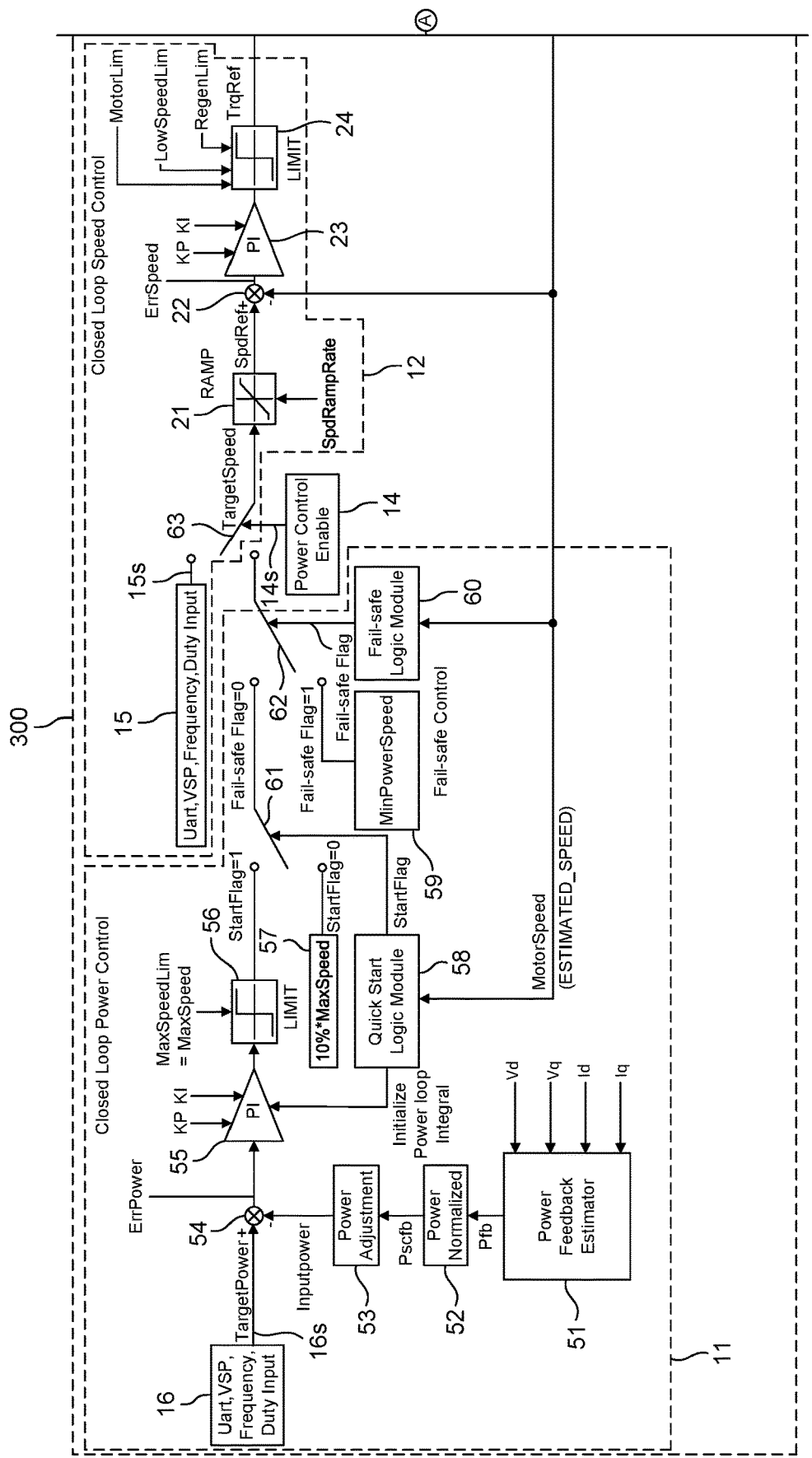
FIGS. 3A-1 and 3A-2 are a schematic block diagrams of a motor control algorithm implemented by a motor controller according to one or more embodiments.
Figures 2, 3A:
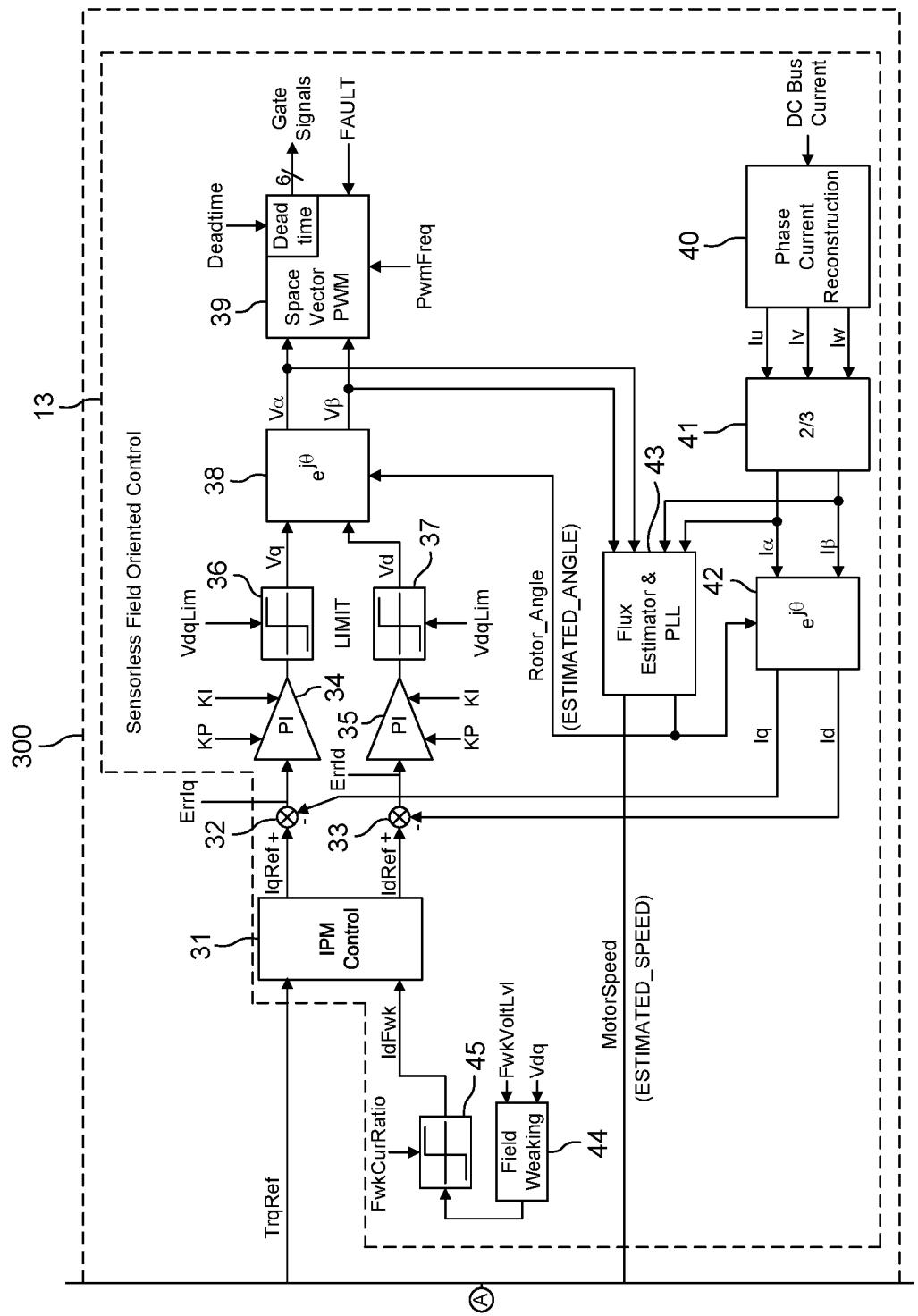
Figure 3B:
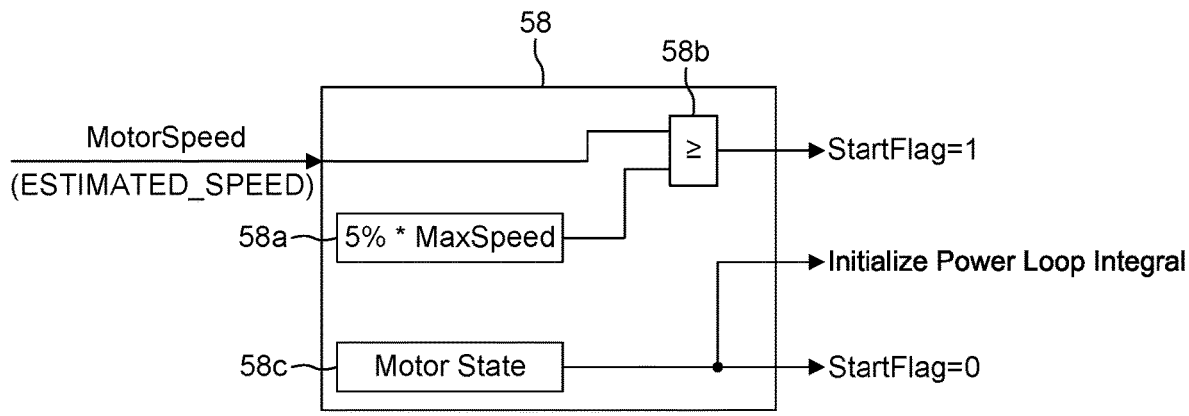
FIG. 3B is a schematic block diagram of a quick start logic module included in the motor control algorithm and used to implement a speed constant control mode and power constant control mode according to one or more embodiments.
Figure 3C:
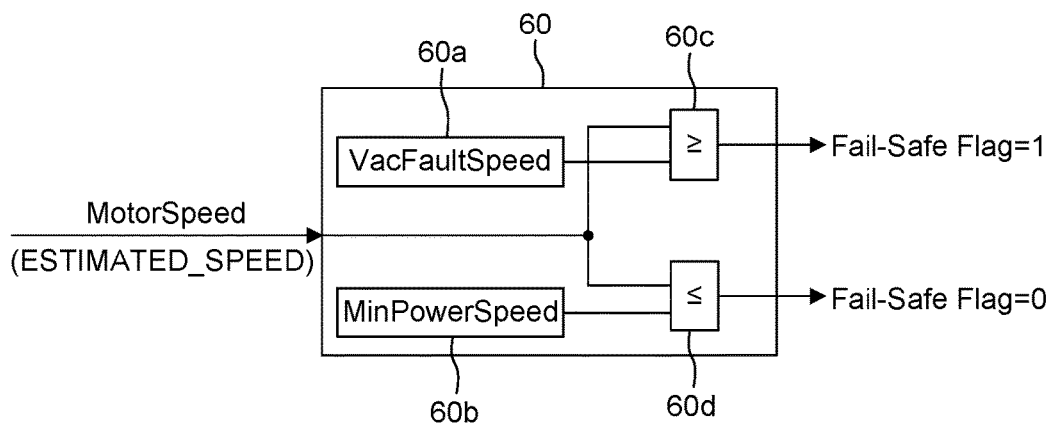
FIG. 3C is a schematic block diagram of fail-safe logic module included in the motor control algorithm and used to implement a fail-safe state during the power constant control mode according to one or more embodiments.

FIGS. 3A-1 and 3A-2 are a schematic block diagrams of a motor control algorithm 300 according to one or more embodiments. FIG. 3B is a schematic block diagram of a quick start logic module included in the motor control algorithm 300 and used to implement a speed constant control mode and a power constant control mode according to one or more embodiments. FIG. 3C is a schematic block diagram of fail-safe logic module included in the motor control algorithm 300 and used to implement a fail-safe state in the power constant control mode according to one or more embodiments.

In particular, FIG. 3A is comprised of two parts, FIGS. 3A-1 and 3A-2, that are joined together at a respective boundary (A) to form the full motor control algorithm 300. The motor control algorithm 300 may be implemented as firmware programmed into the motor controller 6 or by a combination of firmware and circuit components. The motor controller 6 itself may include one or more controllers.

In particular, the motor control algorithm 300 includes a power constant control loop 11, a speed constant control loop 12 (i.e., sensorless FOC), a current control loop 13, and a power control enable block 14 that are implemented by motor controller 6 shown in FIG. 1A. Thus, the motor controller 6 includes a power controller, a speed controller, and a current controller that implement their respective control loops. Thus, the power constant control loop 11 may be used interchangeably with the power controller 11, the speed constant control loop 12 may be used interchangeably with the speed controller 12, the current control loop 13 may be used interchangeably with the current controller 13, and power control enable block 14 may be used interchangeably with the power constant control enable signal 14s. The power control enable block 14, itself, is a controller device configured to toggle the motor controller 6 into one of two operation modes, including power control mode or speed control mode.

As used herein, Vq and Vd represent the stator q and d axis voltages of the motor in a dq coordinate system, respectively. That is, Vq is the motor voltage component on the q-axis of a DQ coordinate system and Vd is the motor voltage component on the d-axis of the DQ coordinate system. Similarly, Iq and Id represent the stator q and d axis currents of the motor in a DQ coordinate system, respectively. That is, Iq is the motor current component on the q-axis of the DQ coordinate system and Id is the motor current component on the d-axis of the DQ coordinate system. Furthermore, each Proportional-Integral (PI) controller receives a proportional gain KP and an integral gain KI.

$$\text{PI output} = KP\Delta + KI\smallint\Delta dt, \qquad \text{Eq. 1,}$$

where $\Delta$ is the error or deviation of an actual measured value (PV) from a setpoint (SP).

$$\Delta = SP - PV \qquad \text{Eq. 2.}$$

Sensorless FOC software supports to drive both types of Permanent Magnet Synchronous Motors (PMSM), i.e., constant air-gap surface mount magnet motor and interior mount magnet motors with variable-reluctance. A sensorless FOC algorithm structure is illustrated in FIG. 3A and follows a cascaded control structure, with an outer power constant control loop, an intermediate speed constant control loop, and an inner current control loop that each play a role at varying the motor windings voltages to drive the motor at a target power or a target speed. If the output of power control enable signal 14s is, for example, logic high (i.e., "1"), the input TargetSpeed of speed constant control loop connects via switch 63 to the output of power constant control loop 11 implementing power constant control. If the output of power control enable signal 14s is logic low (i.e., "0"), the input TargetSpeed of speed constant control loop connects via switch 63 to external digital or analog signal 15s (Universal Asynchronous Receiver/Transmitter (UART), variable-speed pump (VSP), Frequency, and Duty Cycle). In other words, the input of the speed ramp rate SpdRampRate block 21 is switchably connected via switch 63 to one of two alternate paths according to the control of the power control enable block 14. The external digital or analog signal 15s is generated by an external signal generator 15, that is configured to generate the external digital or analog signal 15s based on one or more input parameters directed to setting a target speed of the motor.

The speed controller 12 calculates the motor torque required to follow the target speed (TargetSpeed). TargetSpeed is a variable that sets the target speed of the motor. When power control enable signal 14s is 1, the target speed (TargetSpeed) comes from the output of power constant control loop 11. When power control enable signal 14s is 0, the target speed (TargetSpeed) comes from external digital or analog signal 15s. The target speed is a constant value; it is changed to a sloped raising value SpdRef by speed ramp rate SpdRampRate block 21 according to a speed ramp rate. The error generator 22 receives the SpdRef signal and an actual (measured) motor speed value MotorSpeed (i.e., estimated speed) from a flux estimator and phase-locked loop (PLL) unit 43, and generates a speed error ErrSpeed that is the deviation between the SpdRef signal and the actual (estimated) motor speed.

The PI compensator 23 acts on the error ErrSpeed. The integral term forces the speed steady state error to zero while the proportional term improves the high frequency response. The PI compensator gains KP and KI are adjusted depending on the motor and load characteristics to meet the target dynamic performance. The output of PI compensator 23 is torque current TrqRef that can sustain the motor speed SpdRef. The limiting function block 24 applies one or more limiting functions on the output of PI compensator 23. For example, the limiting function block 24 performs a motor limiting function MotorLim on the output of the PI compensator 23 to prevent integral windup and to maintain the motor currents within the motor max current. The limiting function block 24 performs a low speed limiting function LowSpeedLim on the output of the PI compensator 23 to limit the motor current at low speed. The limiting function block 24 performs a regeneration current limiting function RegenLim on the output of the PI compensator 23 to limit the regeneration current of motor.

While the current loops of current controller 13 drive the motor currents needed to generate this torque current TrqRef. The interior permanent magnet (IPM) controller 31 is configured to separate the torque current TrqRef into IdRef and IqRef for interior mount magnet motors with variable-reluctance based on the difference of Ld and Lq. For a constant air-gap surface mount magnet (SMM) motor the IqRef equals to TrqRef and IdRef equals to 0. IqRef is a current command (i.e., a reference current value) on the q axis. In other words, IqRef is a value of a target current for an Iq current component. Similarly, IdRef is a value of a target current (i.e., a reference current value) for an Id current component. The IPM controller 31 also receives field weakening current IdFwk which is limited by block 45 based on FwkCurRatio. The flux weakening current IdFwk is calculated by Field Weakening block 44 based on the Vdq (that is the square root of Vd and Vq) and FwkVoltLvl which set the field weakening level. The field weakening current IdFwk is added to IdRef in IPM controller 31 for all surface magnet motors (SMMs) and interior permanent magnets (IPMs)

The current Iq loop PI compensator 34, also referred to as an Iq controller 34, acts on the error ErrIq between the IqRef and Iq. The integral term forces the steady state error to zero while the proportional term improves the high frequency response. The PI compensator gains KP and KI are adjusted depending on the motor and load characteristics to meet the target dynamic performance. The limiting function block 36 applies one or more limiting functions on the output of the PI compensator 34 to prevent integral windup and to maintain the inverter output voltage based on VdqLim.

Similarly, the current Id loop PI compensator 35, also referred to as an Id controller 35, acts on error ErrId between the IdRef and Id. The PI compensator gains KP and KI are also adjusted depending on the motor and load characteristics to meet the target dynamic performance, but generally they are the same as current Iq loop PI 34. The limiting function block 37 applies one or more limiting functions on the output of the PI compensator 35 to prevent integral windup and to maintain inverter output voltage based on VdqLim.

A forward vector rotation unit 38 applies a forward vector rotation to the current loop output voltages Vd and Vq and transforms the current loop output voltages Vd and Vq into two phase AC voltage components $V\alpha$ and $V\beta$ based on the rotor angle calculated by the flux estimator and PLL unit 43. A space vector pulse width modulator 39 receives the two phase AC voltage components $V\alpha$ and $V\beta$ and generates the inverter switching signals (i.e., six paths of PWM control signals output from motor controller 6) based on the $V\alpha$ and $V\beta$ voltage inputs and SVPWM. The gate driver 7 then turns on/off the respective power transistors 3 based on the PWM control signals.

The current loops of current controller 13 calculate the inverter voltages to drive the motor currents needed to generate the desired torque. The phase current reconstruction circuit 40 uses single shunt reconstruction to reconstruct the each of the phase currents Iu, Iv, and Iw for each respective phase U, V, and W. In particular, phase current reconstruction circuit 40 measures the DC link current in the shunt resistor during the active vectors of the PWM cycle. In each PWM cycle, there are two different active vectors and the DC link current in each active vector represents current on one motor phase. The calculation of the third phase current value is possible because at balanced condition the sum of all the three winding currents is zero.

The Field-oriented control (FOC) uses the Clarke transform at Clarke transformation unit 41 to apply an alpha-beta transformation on the three-phase currents to derive an alpha current $I\alpha$ and a beta current $I\beta$. The FOC further uses a vector rotation (i.e., a cordic rotation) at vector rotation unit 42 to transform the motor winding currents using alpha and beta currents $I\alpha$ and $I\beta$ into two quasi DC current components, an Id current component that reinforces or weakens the rotor field and an Iq current component that generates motor torque.

Two error generators (e.g., subtractors) 32 and 33 generate error values ErrIq and ErrId, respectively. In particular, error generator 32 receives the reference current value IqRef as a setpoint (SP) value from the IPM control block 31 and the Iq current value from the vector rotation unit 42 as the actual measured value (PV), and generates error value ErrIq. Similarly, error generator 33 receives a reference current value IdRef (i.e., the reference current value on the d axis) from the IPM control block 31, as a setpoint (SP) value and the Id current value from the vector rotation unit 42 as the actual measured value (PV), and generates error value ErrId.

Typically, the torque reference current from the speed controller is separated to Iqref and Idref according to the difference of motor inductance Ld, Lq by IPM Control block 31. Normally, IdRef is zero for a SMM motor or a negative value scaling to torque current TrqRef for an IPM motor. However, above a certain speed, known as the base speed, the inverter output voltage becomes limited by the DC bus voltage. In this situation, the field weakening controller 44 generates a negative Id plus the Id separated from torque reference current to oppose the rotor magnet field that reduces the winding back electromotive force (EMF). This enables operation at higher speeds but at a lower torque output. The Field Weakening block 44 is to adjust the Id current to maintain the motor voltage magnitude within the bus voltage limit.

A rotor magnet position estimator includes a flux estimator and PLL 43. The flux estimator and flux PLL are running in order to detect the rotor position and measure the motor speed of a running motor. Flux is calculated based on feedback current (i.e., using alpha and beta currents $I\alpha$ and $I\beta$), estimated voltages $V\alpha$ and $V\beta$ (based on DC bus feedback voltage and a modulation index), and motor parameters (inductance and resistance). The output of the flux estimator represents rotor magnet fluxes in Alpha-Beta (stationary orthogonal frame, u-phase aligned with Alpha) two-phase quantities.

The angle and frequency phase-locked loop (PLL) of the flux estimator and PLL 43 estimates the flux angle (i.e., estimated rotor angle) and motor speed from the rotor magnet flux vector in Alpha-Beta components. A vector rotation of the PLL calculates the error between the rotor flux angle and the estimated angle. API compensator and integrator of the PLL in the closed loop path force angle and frequency estimate to track the angle and frequency of the rotor flux. The motor speed is derived from the rotor frequency according to the number of rotor poles.

When driving an interior permanent magnet (IPM) motor the rotor saliency can generate a reluctance torque component to augment the torque produced by the rotor magnet. When driving a surface magnet motor (SMM), there is zero saliency (Ld=Lq) and Id is set to zero for maximum efficiency. In the case of IPM motor which has saliency (Ld<Lq) a negative Id will produce positive reluctance torque. The most efficient operating point is when the total torque is maximized for a given current magnitude. The most efficient operating point of surface magnet motors (SMM) and interior permanent magnets (IPM) is calculated by IPM Control block 31.

It will be appreciated that the speed constant controller 12 and the current controller 13 as shown merely illustrated one example configuration and are not limited thereto. For example, in general, the speed constant controller 12 is configured with a speed control loop that outputs the torque current TrqRef based on target speed TargetSpeed. In addition, the current controller 13 is configured to calculate voltage and current information used for driving the motor based on the torque current TrqRef output from the speed constant controller 12. In particular, the current controller 13 determines the stator q axis and d axis voltages Vd and Vq, as well as the stator q axis and d axis currents Iq and Id. The voltage and current information Vd, Vq, Iq, and Id are provided to the power constant controller 11, and specifically to the power feedback estimator 51 of the power constant control loop 11.

The power feedback estimator 51 receives the voltage and current information Vd, Vq, Iq, and Id from the current control loop 13, calculates the feedback power of the motor M. Specifically, the Vd, Vq, Id, Iq inputs of block 51 are supplied by blocks 42, 36, and 37, respectively. As noted above, the motor power is also the output power of inverter 1. Thus, the feedback power calculated by the power feedback estimator 51 is the motor power but is also the output power of inverter 1 shown in FIG. 1A.

The feedback power Pfb is calculated by the following DQ coordinate equation Eq. 3:

$$Pfb = 3/2(V_d I_d + V_q I_q) \qquad \text{Eq. 3.}$$

Here, Equation 3 is based on the principle of a normal coordinate formula by equal amplitude transform, represented by equation Eq. 4:

$$\text{power} = u_a i_a + u_b i_b + u_c i_c \qquad \text{Eq. 4,}$$

where, $u_a$, $u_b$, $u_c$ represent the instantaneous value of motor input three phase voltage and $i_a$, $i_b$, $i_c$ represent the instantaneous value of motor input three phase current.

A first power scaler, power normalized block 52, scales the feedback power Pfb to derive a scaled (normalized) feedback power value Pscfb. Thus, the first power scaler 52 normalizes the feedback power Pfb, and the output of the power scaler, power normalized block 52, is represented by the following equation Eq. 5:

$$Pscfb = Pfb \times \frac{16384}{MotorMaxPower}. \qquad \text{Eq. 5}$$

The scaled (normalized) feedback power value Pscfb is then provided to the second scaler, power adjustment block 53, that converges (scales) the scaled feedback power value Pscfb (i.e., output power) to input power Inputpower based on adjustment parameters. The input power value Inputpower is then provided to an error generator (e.g., subtractor) 54. The error generator 54 receives a target power value (TargetPower) as a reference value and the input power value Inputpower from the second scaler 54, and generates a power error value ErrPower therefrom. The power error value ErrPower is a deviation or difference between the target power and the actual (estimated) input power. In other words, power error value ErrPower is zero if the target power and the actual (estimated) input power Inputpower are equal and is non-zero if the target power and the actual (estimated) input power Inputpower are not equal, and thus is representative of the difference there between.

The error generator 54 provides the power error value ErrPower to the power control loop PI controller 55, and the PI controller 55 generates target speed (TargetSpeed) based on the power error value ErrPower. The target power TargetPower comes from an external signal generator 16 that is configured to generate an external digital or analog signal 16s (UART, VSP, Frequency, and Duty Cycle) that provides the target power TargetPower. The external signal generators 15 and 16 may be separate devices or may be combined into a single device.

The target speed (TargetSpeed) output from the power control loop PI controller 55 is limited by limiting function block 56. For example, when the target speed (TargetSpeed) exceeds a threshold value MaxSpeedLim(=MaxSpeed), then the target speed will be limited to MaxSpeedLim, where MaxSpeed is the motor max speed.

Switch 61 is used for implementing a quick start operation using a speed constant control mode prior to a power constant control mode. In particular, the motor controller 6 will be set in speed constant control mode in order to perform a quick start operation of the motor, and will then be switched into power constant control mode after one or more motor start conditions have been satisfied. The timing and relationship of these two control modes is further illustrated in FIG. 5.

In the first step of quick start (i.e., speed constant control mode), the motor speed MotorSpeed of the motor is less than 5%*MaxSpeed, as monitored by the quick start logic module 58. Additionally, the StartFlag output from the quick start logic module 58 has been initialized to 0 in response to a motor stop state (e.g., the controller 6 in FIG. 1A received a motor stop command or did not receive a start command after power on). That is to mean that the StartFlag is set to 0 prior to the controller 6 enters into a motor running state and the StartFlag is maintained at 0 after the controller 6 enters into the running state while the motor speed MotorSpeed is less than 5%*MaxSpeed. Thus, the quick start logic module 58 receives the measured motor speed MotorSpeed from block 43, compares the motor speed MotorSpeed to a mode threshold value (e.g., 5%*MaxSpeed), and sets the value of the StartFlag based on the comparison results. This mode threshold value represents a switching point of the two control modes and may be configurable based on the respective application.

The StartFlag output from quick start logic module 58 is a control signal for switch 61 to switchably control the switching state thereof. As a result of the StartFlag being set to 0, the target speed of speed controller 12 is connected to signal generation block 57 (10%*MaxSpeed), which sets the target speed TargetSpeed of the TargetSpeed signal path to 10%*MaxSpeed. It will be appreciated that the fraction or percentage of the MaxSpeed value applied by the signal generation block 57 is configurable based on the respective application.

The TargetSpeed signal path may include a control mode switch 61 for quick start control and/or may include a fail-safe switch 62 for fail-safe control. In other words, quick start control and fail-safe control may be implemented independently of each other or, as shown, in combination. If fail-safe control is not implemented, switch 62, block 59, and block 60 can be removed and the output of switch 61 would be coupled to switch 63. If quick start control is not implemented, switch 61, block 57, and block 58 can be removed and switch 62 would be coupled to block 56 when the fail-safe flag=0. Thus, the TargetSpeed signal path may vary according to the switching state of these switches to provide the TargetSpeed to block 21. TargetSpeed signal path may also include blocks 57, 58 and 59, each of each generate values for the target speed TargetSpeed provided to block 21

Generally, the fail-safe function will be operated only after quick start has been completed. In the quick start process, the fail-safe function is not enabled, then fail-safe flag=0 and the switch 62 connects to switch 61. After the quick start process, the StartFlag output from block 58 is set to 1, then the switch 61 connects to block 56 and fail safe function is enabled. Switch 62 will connect to switch 61 or block 59 according to the fail-safe sate.

The initialize power loop integral is also set at this first step by the quick start logic module 58 when StartFlag is 0. Then, the PI controller 55 is initialized to NormalSpeed of the TargetPower, which is the motor speed that corresponds to the target power of the motor. That means to initialize the KI∫Δdt to NormalSpeed of the TargetPower in be below PI 55 controller expression.

$$\text{PI output} = KP\Delta + KI\int \Delta dt, \qquad \text{Eq. 6,}$$

In the second step of quick start (i.e., power constant control mode), the MotorSpeed is equal to or greater than 5%*MaxSpeed, as monitored by the quick start logic module 58. As a result of meeting this threshold, the StartFlag output from quick start logic module 58 is set to 1. In response to the StartFlag being set to 1, the target speed of speed controller 12 is connected to block 56, which is the output of the power control loop. As a result, the control mode of the motor controller 6 changes from speed constant control mode to power constant control mode.

FIG. 3B is a schematic block diagram of the quick start logic module 58 according to FIG. 3A. The quick start logic module 58 includes a threshold generator 58a, a comparator 58b, and a motor state detector 58c. The threshold generator 58a sets the mode threshold value used by the comparator 58b. The motor state detector 58c detects the state of the motor, and more particularly, detects when the motor is stopped. When the motor stops, the motor state detector 58c sets the StartFlag to 0, which also initializes the PI controller 55.

Thus, initially, the StartFlag has been set to 0 by the motor state detector 58c, so that when the controller 6 enters into a running state, the StartFlag is already initialized to 0. As a result, the switch 61 is connected to block 57 implementing speed constant control and the integral of power loop, PI 55, is initialized to NormalSpeed of the TargetPower in this process. The mode threshold value, for example, may be set based on a preset fraction or percentage of the motor maximum speed MaxSpeed. Comparator 58b receives the mode threshold value from the threshold generator 58a and the measured motor speed MotorSpeed from block 43 and performs a comparison. If the measured motor speed Motor-Speed is equal to or greater than the mode threshold value, comparator 58b sets the StartFlag to 1. The state of switch 61 is controlled by the StartFlag generated by the quick start logic module 58.

The power calculation method utilized by the power controller 11 is only influenced by the accuracy of current sampling resulting from stator q axis and d axis currents Iq and Id and by the accuracy of the stator q axis and d axis voltages Vd and Vq that is output from the PI controllers 34 and 35. As a result, this method can work well in all motor speed ranges including a flux weakening zone. However, it does not work well at over-modulation conditions.

It is noted that the second scaler 53 performs an input power adjustment to derive the measured input power from the scaled feedback power Pscfb (i.e., the scaled output power). As shown in FIG. 3A, in order to control the input power of the inverter 1 for battery protection, an adjusting parameter is set on the signal path of the feedback power. The adjusting parameter is set according to the following procedure.

First, the adjusting value at second scaler 53 is set to a value of 1, the target power is varied at a plurality of values from low power to maximum power, and the input power value output by the second scaler 53 is recorded in memory for each value of the varied target power.

Second, the ratio between the input power and the target power is calculated based on the recorded values. The determined ratio is set as the adjusting parameter (i.e., the scaler value) for the second scaler 53. Thus, the adjusting parameter is set such that the scaled output power from the first scaler 52 converges to the input power. In other words, the scaled output power is converted to an estimated input power Inputpower.

After the above steps, the input power of the inverter can be matched to the target power using the error generator 54 and the PI controller 55. The output of the PI controller 45 is the target speed (TargetSpeed) provided by the power controller 11.

A quick start function is now described using the motor control algorithm 300.

Figure 4:
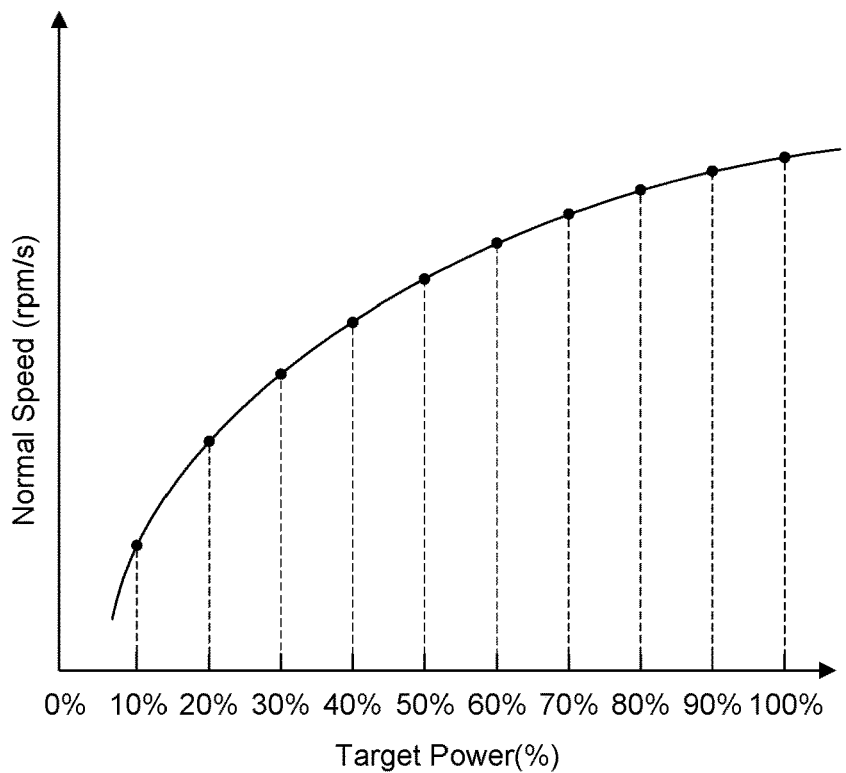
FIG. 4 illustrates a fitted curve (i.e., a normal speed fit curve) where normal motor speed is fit to the target power according to one or more embodiments.

A normal motor speed (rpm/s) is tested at some target power points. These target power points are set at equal intervals from small to large. For example, the target power points may be percentages set at increments of 10% from 0% to 100%, with 100% representative of a maximum target power of the motor. Then, curve fitting is performed such that a curve is constructed for the target power and the normal motor speed. FIG. 4 illustrates a fitted curve (i.e., a normal speed fit curve) where normal motor speed is fit to the target power.

The equation of the fitting curve is set forth in Equation 7 below:

$$\text{Normal Speed} = A*\text{TargetPower}^2 + B*\text{TargetPower} + C \qquad \text{Eq. 7,}$$

where A, B, and C are fitting parameters for the fitting curve.

Figure 5:
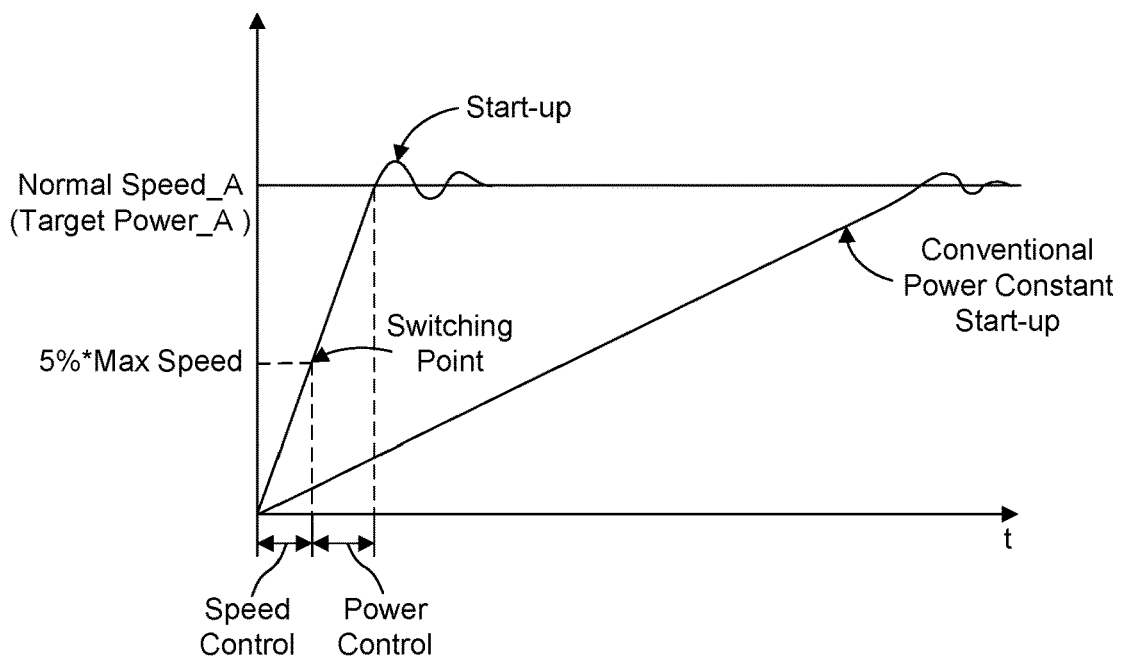
FIG. 5 is a graph that illustrates a motor quick start-up flow according to one or more embodiments compared to a conventional power constant start-up flow.

FIG. 5 is a graph that illustrates a motor quick start-up flow according to one or more embodiments compared to a conventional power constant start-up flow. According to the start-up flow that is implemented using the motor control algorithm 300, the motor M initially starts with speed constant control. That is, the motor controller 6 is initially set into speed constant control mode at start up (i.e., upon turning on a power switch to the motor). The target speed TargetSpeed is set at 10% of the maximum speed MaxSpeed by signal generator 57. When the motor speed MotorSpeed determined by the flux estimator and PLL unit 43 reaches a predetermined percentage of the maximum speed MaxSpeed, the quick start logic module sets the StartFlag=1, and then the switch 61 responds by coupling to block 56 achieving transformation from speed constant control to power constant control. The predetermined percentage is set to a percentage or an amount that greater than zero but is less than the quick start target speed TargetSpeed (e.g., 10% of the maximum speed MaxSpeed) in the quick start first step. In this example, the predetermined percentage is set to 5%, but is not limited thereto.

This predetermined percentage corresponds to a switching threshold or switching point of the motor speed at which the operation mode of the motor controller 6 switches from speed constant control mode to power constant control mode. Thus, when the motor speed in this example reaches 5% of the maximum speed, the control mode switches to power constant control mode. The control mode remains in power constant control mode after start-up, or may be disabled during runtime of the motor after the start-up period to meet other system requirements. The start-up period is defined from zero motor speed increasing to the NormalSpeed corresponding to TargetPower.

In the first step of the quick start-up process, the integration of power controller 55 is initialized to a normal speed Normal Speed at this moment using the fitting curve illustrated in FIG. 4. Here, the normal speed corresponds to the target power TargetPower. FIG. 5 shows a graph that illustrates a motor quick start-up flow according to one or more embodiments compared to a conventional power constant start-up flow, the normal speed corresponding to TargetPower_A is NormalSpeed_A.

The target speed TargetSpeed of the speed control mode will sustain NormalSpeed while the power control loop is initialized to the normal speed NormalSpeed. This is because the frequency width of the power controller 55 is smaller than the frequency width of the speed controller 23 and the integration of power controller 55 is affected by speed controller 23. Accordingly, these features can be utilized to achieve quick start up of the motor.

In view of the above, power constant control is configured to sustain the power consumption at a constant level, which may e.g. sustain an air flow in a fan application and can be implemented using currents Iq and Id and voltages Vd and Vq as its feedback inputs. In addition, measured output power of the inverter 1 is adjusted (i.e., converted) by the power control loop 11 (e.g., scalers 52 and 53) to the input power of the inverter 1, which provides battery supply protection. Furthermore, during motor start-up, speed constant control mode may be used initially to achieve a faster start-up before switching to power constant control mode. It can be viewed as to which mode the motor controller 6 is in by examining the motor speed when the fan's inlet is blocked. When the motor speed changes and the fan's inlet is blocked, the motor controller 6 is in power constant control. When the motor speed does not change and the fan's inlet is blocked, the motor controller 6 is speed constant control mode.

Turning back to FIG. 3A, the power controller 11 may also include a fail-safe switch 62 that is controlled by a fail-safe logic module 60. Switch 62 is used for implementing a fail-safe function while the motor controller 6 is in power constant control mode. The fail-safe logic module 60 is configured to receive the measured motor speed MotorSpeed from block 43 and performs a comparison thereon.

The initialized value of fail-safe flag is 0, so if the measured motor speed MotorSpeed is less than a fault speed threshold value VacFaultSpeed when the motor is running in power constant control mode, then the fail-safe logic module 60 sustains the fail-safe flag to 0 and consequently controls the fail-safe switch 62 to connect to switch 61, which, being in power constant control mode, is connected to block 56. As a result, the motor controller 6 continues to operate in power constant control mode.

If the measured motor speed MotorSpeed is equal to or greater than a fault speed threshold value VacFaultSpeed when the motor is running in power constant control mode, then the fail-safe logic module 60 sets a fail-safe flag to 1 and consequently controls the fail-safe switch 62 to connect to signal generation block 59. The signal generation block 59 sets the target speed TargetSpeed to a minimum power speed MinPowerSpeed. As a result, the TargetSpeed provided to block 21 will be set to the MinPowerSpeed value and the control mode of the motor controller 6 switches to speed constant control mode according to entering into a fail-safe state. That is, the motor stroller 6 is switched out of the power constant control mode and into speed constant control mode by switch 61 being coupled to signal generator 59.

The fail-safe logic module 60, and hence the motor controller 6, remains in the fail-safe state until certain conditions are met. For example, safe operating conditions are detected, in response to which the fail-safe logic module 60 reconnects switch 62 to switch 61 by setting the fail-safe flag to 0. Alternatively, unsafe conditions continue to persist and the fail-safe logic module 60 shuts down the motor.

In the fail-safe state, the fail-safe logic module 60 continues to monitor the measured motor speed MotorSpeed and switchably couples the fail-safe switch 62 to either switch 61 (which is set in its power constant control mode position coupled to block 56 and is representative of a fail-safe power constant control mode) or to signal generator 59 (which is representative of a fail-safe speed constant control mode) based on the evaluation of the measured motor speed MotorSpeed. The fault speed threshold value VacFaultSpeed may be set at, for example, 1.08*NormalSpeed. The minimum power speed MinPowerSpeed may be set at, for example, 0.7*NormalSpeed. However, these thresholds are configurable based on application.

In the fail-safe state, the measured motor speed MotorSpeed should decrease when fail-safe switch 62 is coupled to the signal generator 59 (i.e., fail-safe flag=1). If the measured motor speed MotorSpeed reaches (i.e., decreases to) a minimum power speed threshold MinPowerSpeed, the fail-safe logic module 60 sets the fail-safe flag to 0 and the fail-safe switch 62 is connected to block 56 that is the output of power control loop. As a result, the mode of the motor controller 6 changes from the fail-safe speed constant control mode to the fail-safe power constant control mode.

This process may repeat one or more times. For example, while still in the fail-safe state, the measured motor speed MotorSpeed may again start to increase towards fault speed threshold value VacFaultSpeed. Should the measured motor speed MotorSpeed reach or exceed the fault speed threshold value VacFaultSpeed, the fail-safe logic module 60 enters into fail-safe speed constant control mode by setting the fail-safe flag to 1, which causes the fail-safe switch 62 to be connected to the signal generator 59.

FIG. 3C is a schematic block diagram of the fail-safe logic module 60 according to FIG. 3A. The fail-safe logic module 60 includes a first threshold generator 60a, a second threshold generator 60b, a first comparator 60c, and a second comparator 60d. The first threshold generator 60a sets the fault speed threshold value VacFaultSpeed used by the first comparator 60c. The fault speed threshold value VacFaultSpeed, for example, may be set to be greater than the motor normal speed and may be based on a preset fraction or percentage of the motor normal speed.

The second threshold generator 60b sets the minimum power speed threshold MinPowerSpeed used by the second comparator 60d. The minimum power speed threshold MinPowerSpeed, for example, may be set to be less than the motor normal speed and may be based on a preset fraction or percentage of the motor normal speed.

Both comparators 60c and 60d receive their respective threshold value as well as the the measured motor speed MotorSpeed from block 43, and both perform a respective comparison. If the measured motor speed MotorSpeed is equal to or greater than the fault speed threshold value VacFaultSpeed, comparator 60c sets the fail-safe flag to 1, causing the motor controller 6 to enter fail-safe speed constant control mode and causing fail-safe switch 62 to be coupled to the signal generator 59.

If the measured motor speed MotorSpeed is equal to or less than minimum power speed threshold MinPowerSpeed, comparator 60d sets the fail-safe flag to 0, causing the motor controller 6 to enter fail-safe power constant control mode and causing fail-safe switch 62 to be coupled to block 56.

As will be described in greater detail below, the fail-safe state, while in power constant control mode, enables a vacuum cleaner or other suction device to remove inlet blockages automatically (i.e., without user intervention) during runtime of the motor.

Figure 6:
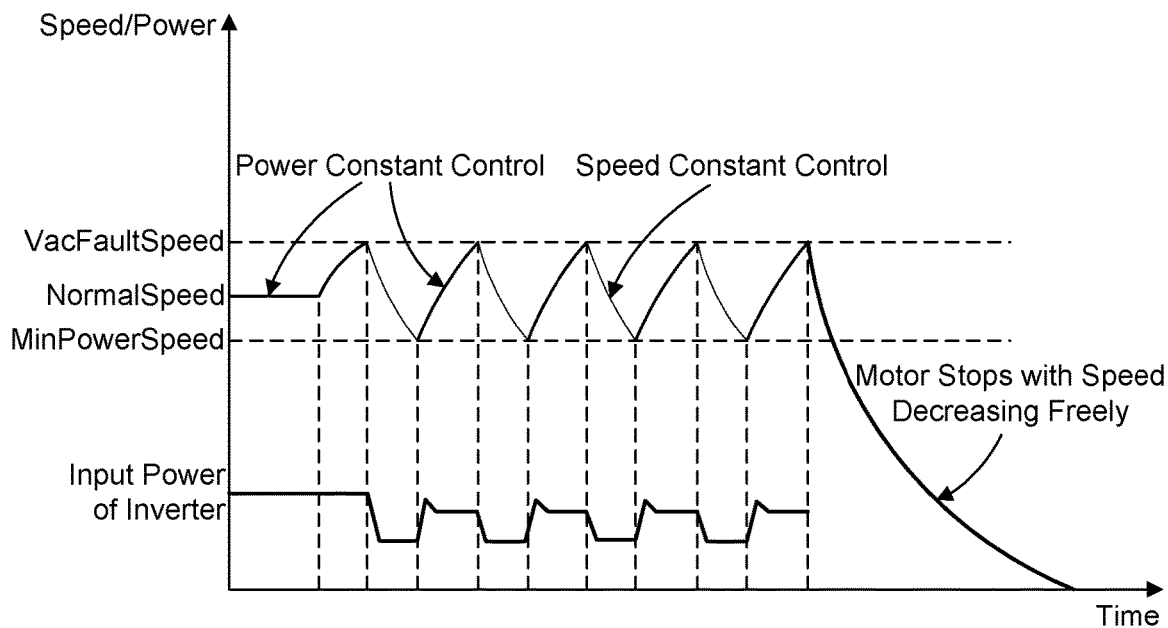
FIG. 6 is a diagram illustrating motor speed and input power of the inverter 1 according to the fail-safe state of the motor controller 6 according to one or more embodiments.

FIG. 6 is a diagram illustrating motor speed and input power of the inverter 1 according to the fail-safe state of the motor controller 6 according to one or more embodiments. As noted above, while in power constant control mode (i.e., switch 61 coupled to block 56), the motor controller 6 may be repeatedly switched between fail-safe speed constant control mode (i.e., switch 62 coupled to block 59) and fail-safe power constant control mode (i.e., switch 62 coupled to block 56). The fail-safe logic module 60 monitors the measured motor speed MotorSpeed, as described above, and controls switch 62 accordingly.

While in power constant control mode, the motor speed is maintained by the power control loop 11 at normal speed Normal Speed according to the target power TargetPower. In the event of an inlet blockage, the motor speed will automatically increase. If the motor speed increases to the fault speed threshold value VacFaultSpeed, the fail-safe logic module 60 will enter the fail-safe state and couple switch 62 to signal generator 59 to decrease the motor speed, which helps to prevent rising temperatures. If the motor speed decreases to the minimum power speed threshold MinPowerSpeed, the fail-safe logic module 60 will couple switch 62 back to the limiting function block 56 to allow the motor speed to increase according to the target speed TargetSpeed output by PI controller 55 and limiting function block 56. If the inlet blockage remains, the motor speed will again automatically increase back to the fault speed threshold value VacFaultSpeed, thereby causing the process to repeat. If the inlet blockage is cleared (i.e., removed), the motor speed will likely not increase back to the fault speed threshold value VacFaultSpeed, and the fail-safe logic module 60 may decide to exit the fail-safe state and resume normal operation under the power constant control mode. If the motor speed reaches the fault speed threshold value VacFaultSpeed a threshold number of consecutive times (e.g., 5 times) while in the fail-safe state, the fail-safe logic module 60 may stop the motor function and stop the motor.

Switching between the fail-safe speed constant control mode and the fail-safe power constant control mode causes the motor speed to change rapidly. The force of vacuuming in this process changes dramatically, as can be seen from the input power of inverter 1 in FIG. 7. The change in air flow (i.e., suction force) is applied to the debris blocking the inlet, with the goal of the debris being released or inhaled by the vacuum as a result of the changing force. If the blockage cannot be removed by this process, the motor is stopped after a number of intervals so that the blockage can be removed manually and to prevent damage to the motor and/or circuit board.

Figure 7:
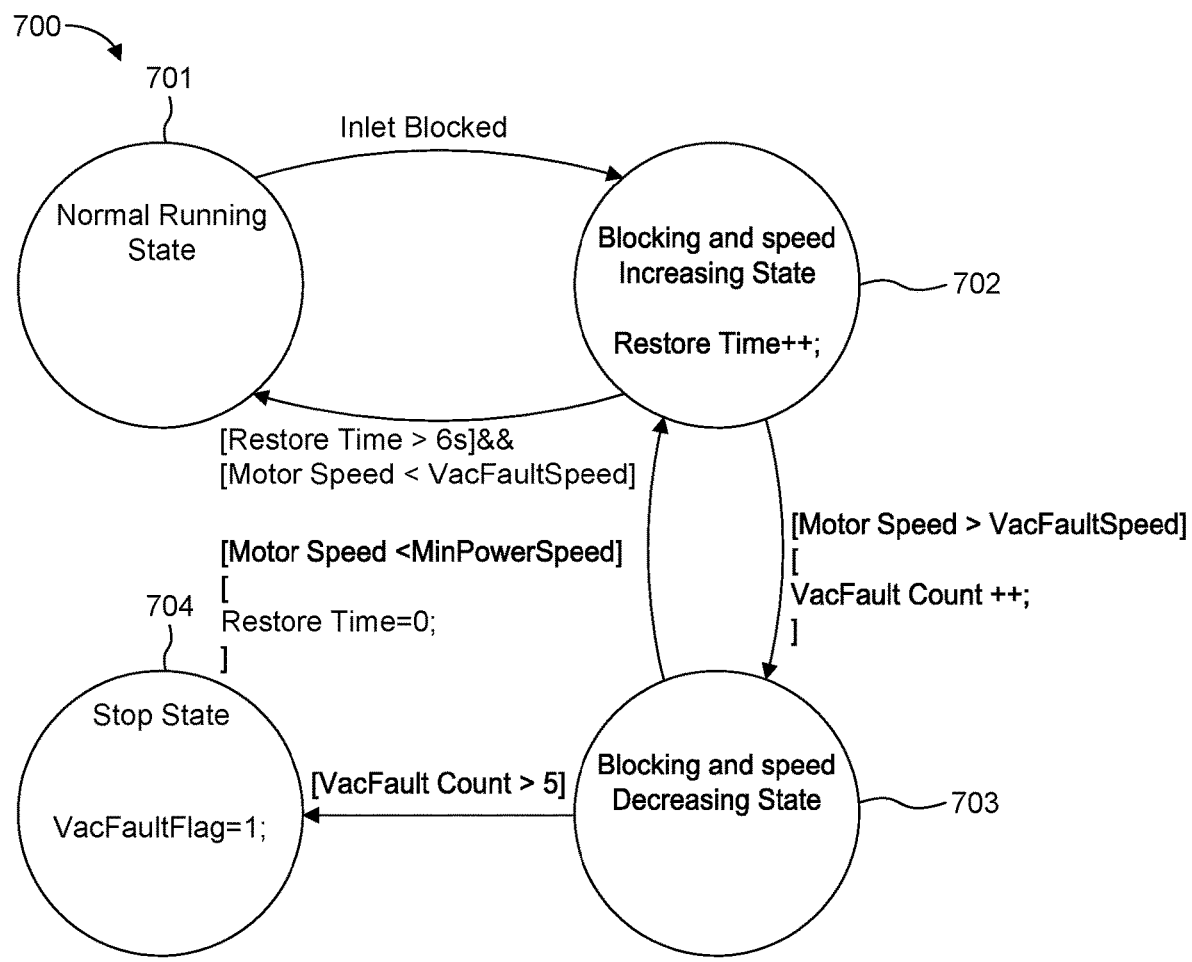
FIG. 7 is a flow diagram of the fail-safe logic flow implemented by the fail-safe logic module 60 according to one or more embodiments.

FIG. 7 is a flow diagram of the fail-safe logic flow implemented by the fail-safe logic module 60 according to one or more embodiments. The fail-safe logic flow 700 includes a normal running state 701, a blocking and speed increasing state 702, a blocking and speed decreasing state 703, and a stop state 704, all of which operate in the main power constant control mode of the motor controller 6 during which switch 61 is coupled to the limiting function block 56.

With switch 61 coupled to the limiting function block 56 and switch 62 coupled to switch 61, the motor controller 6 is operated in the normal running state 701 until the inlet is blocked. The normal running state 701 switches to blocking and speed increasing state 702 when the inlet is blocked. The blocked inlet is detected by the fail-safe logic module 60 in response to the measured motor speed increasing from the normal speed. For example, the fail-safe logic module 60 may compare the measured motor speed to a predetermined threshold (e.g., 1.01*Normal Speed) for detecting the blocked inlet.

If the motor via the fail-safe logic module 60 is at the blocking and speed increasing state 702 for a predetermined time interval (e.g., six seconds) and the motor speed does not reach VacFaultSpeed, then the fail-safe logic module 60 returns to normal running state 701. This may indicate an inlet blockage that is partial or temporary and is not dangerous to the motor or the circuit board. In the blocking and speed increasing state 702, the control mode is still the main power constant control and the target speed is equal to the output of the PI controller 55 and limiting function block 56. No fail-safe state has been triggered.

In contrast, if the motor speed reaches VacfaultSpeed in blocking and speed increasing state 702, the fail-safe logic module 60 will switch to the blocking and speed decreasing state 703 and a VacFault count value increments by one. By entering the blocking and speed decreasing state 703, the fail-safe logic module 60 has triggered the fail-safe state. Here, the target speed is set as MinPowerSpeed with a fail-safe speed constant control mode being implemented as sub-state. When the motor speed decreases to MinPowerSpeed, the fail-safe logic module 60 switches to the blocking and speed increasing state 702 again and restores to the power constant control mode.

The blocking and speed increasing state 702 is repeated and may either exit the fail-safe state by meeting the criteria to switch to the normal running state 701 or may remain in the fail-safe state by switching to the blocking and speed decreasing state 703 after meeting the criteria. In the latter case, the blocking and speed decreasing state 703 is repeated.

Each time the fail-safe logic module 60 switches to the blocking and speed decreasing state 703, the VacFault count value stored in a counter of the fail-safe logic module 60 increments by one and is compared with a count threshold (e.g., fault value=5). If the VacFault count value is equal to the count threshold, the fail-safe logic module 60 switches to the stop state 704 and stops the motor by setting a VacFaultFlag=1. On the condition that the VacFault count value is less than the count threshold, the fail-safe logic module 60 monitors the motor speed by comparing the motor speed to the MinPowerSpeed, and triggers the speed increasing state 702, thereby causing the motor speed to increase, on a condition that the motor speed is equal to or less than MinPowerSpeed.

The fail-safe logic module 60 results in the following advantages. The fail-safe state prolongs the life of permanent magnet synchronous motor, preventing burnout. The cost of implementing the fail-safe state is low with sensorless Field Oriented Control (FOC). Power constant control can sustain air flow when the inlet is not fully blocked. Decreasing and increasing motor speed repeatedly and quickly will clear debris automatically.

While various embodiments have been described, it will be apparent to those of ordinary skill in the art that many more embodiments and implementations are possible within the scope of the disclosure. Accordingly, the invention is not to be restricted except in light of the attached claims and their equivalents. With regard to the various functions performed by the components or structures described above (assemblies, devices, circuits, systems, etc.), the terms (including a reference to a "means") used to describe such components are intended to correspond, unless otherwise indicated, to any component or structure that performs the specified function of the described component (i.e., that is functionally equivalent), even if not structurally equivalent to the disclosed structure that performs the function in the exemplary implementations of the invention illustrated herein.

Furthermore, the following claims are hereby incorporated into the detailed description, where each claim may stand on its own as a separate example embodiment. While each claim may stand on its own as a separate example embodiment, it is to be noted that—although a dependent claim may refer in the claims to a specific combination with one or more other claims—other example embodiments may also include a combination of the dependent claim with the subject matter of each other dependent or independent claim. Such combinations are proposed herein unless it is stated that a specific combination is not intended. Furthermore, it is intended to include also features of a claim to any other independent claim even if this claim is not directly made dependent to the independent claim.

It is further to be noted that methods disclosed in the specification or in the claims may be implemented by a device having means for performing each of the respective acts of these methods.

Further, it is to be understood that the disclosure of multiple acts or functions disclosed in the specification or in the claims may not be construed as to be within the specific order. Therefore, the disclosure of multiple acts or functions will not limit these to a particular order unless such acts or functions are not interchangeable for technical reasons. Furthermore, in some embodiments a single act may include or may be broken into multiple sub acts. Such sub acts may be included and part of the disclosure of this single act unless explicitly excluded.

Depending on certain implementation requirements, embodiments provided herein can be implemented in hardware or in software. The implementation can be performed using a digital storage medium, for example a floppy disk, a DVD, a Blue-Ray, a CD, a RAM, a ROM, a PROM, an EPROM, an EEPROM or a FLASH memory, having electronically readable control signals stored thereon, which cooperate (or are capable of cooperating) with a programmable computer system such that the respective method is performed. Therefore, the digital storage medium may be computer readable.

Instructions may be executed by one or more processors, such as one or more central processing units (CPU), digital signal processors (DSPs), general purpose microprocessors, application specific integrated circuits (ASICs), field programmable logic arrays (FPGAs), or other equivalent integrated or discrete logic circuitry. Accordingly, the term "processor," as used herein refers to any of the foregoing structure or any other structure suitable for implementation of the techniques described herein. In addition, in some aspects, the functionality described herein may be provided within dedicated hardware and/or software modules. Also, the techniques could be fully implemented in one or more circuits or logic elements.

Thus, the techniques described in this disclosure may be implemented, at least in part, in hardware, software, firmware, or any combination thereof. For example, various aspects of the described techniques may be implemented within one or more processors, including one or more microprocessors, DSPs, ASICs, or any other equivalent integrated or discrete logic circuitry, as well as any combinations of such components.

A control unit including hardware may also perform one or more of the techniques described in this disclosure. Such hardware, software, and firmware may be implemented within the same device or within separate devices to support the various techniques described in this disclosure. Software may be stored on a non-transitory computer-readable medium such that the non-transitory computer readable medium includes a program code or a program algorithm stored thereon which, when executed, causes a computer program to perform the steps of a method.

Although various exemplary embodiments have been disclosed, it will be apparent to those skilled in the art that various changes and modifications can be made which will achieve some of the advantages of the concepts disclosed herein without departing from the spirit and scope of the invention. It will be obvious to those reasonably skilled in the art that other components performing the same functions may be suitably substituted. It is to be understood that other embodiments may be utilized and structural or logical changes may be made without departing from the scope of the present invention. It should be mentioned that features explained with reference to a specific figure may be combined with features of other figures, even in those not explicitly mentioned. Such modifications to the general inventive concept are intended to be covered by the appended claims and their legal equivalents.

What is claimed is:

1. A motor controller configured to drive a permanent magnet synchronous motor (PMSM) with sensorless Field Oriented Control (FOC), the motor controller comprising:
   a current controller configured to generate control signals for driving the PMSM, wherein the current controller is configured to measure voltage information of the PMSM and current information of the PMSM;
   a power constant controller configured to receive the voltage information and the current information, and generate a first target speed based on a target power of the PMSM and based on the voltage information and the current information;
   a first signal generator configured to generate a second target speed;
   a speed constant controller coupled between the power constant controller and the current controller, wherein the speed constant controller is configured to switchably receive the first target speed and the second target speed, and regulate a motor speed of the PMSM based on the received first target speed or the received second target speed;
   a first switch configured to switchably couple the speed constant controller to the power constant controller, to receive the first target speed, in a first switch state or to the first signal generator, to receive the second target speed, in a second switch state; and
   a first switch controller configured to control a switching state of the first switch,
   wherein the power constant controller comprises:
      a power feedback estimator configured to receive the voltage information and the current information from the current controller and calculate a feedback power of the PMSM based on the voltage information and the current information, and
      a first scaler configured to receive the feedback power from the power feedback estimator and convert the feedback power into a scaled feedback power,
      wherein the power constant controller is configured to generate the first target speed based on the target power and the scaled feedback power.

2. The motor controller of claim 1, wherein:
   the speed constant controller is configured to generate a first torque current based on the first target speed and a second torque current based on the second target speed, wherein the first torque current corresponds to a first motor torque applied to the PMSM to achieve the first target speed and the second torque current corresponds to a second motor torque applied to the PMSM to achieve the second target speed, and
   the current controller is configured to generate the control signals based on the first torque current or the second torque current.

3. The motor controller of claim 1, further comprising:
   a second signal generator configured to generate a third target speed;
   a second switch configured to switchably couple the speed constant controller to the first switch, to receive the first target speed or the second target speed, in a first switch state or to the second signal generator, to receive the third target speed, in a second switch state; and
   a second switch controller configured to control a switching state of the second switch,
   wherein the speed constant controller is coupled to the second switch and is configured to receive either the first target speed, the second target speed, or the third target speed based on the switching state of the first switch and the switching state of the second switch.

4. The motor controller of claim 1, wherein:
   the voltage information includes a first motor voltage component corresponding to a q-axis of a DQ coordinate system and a second motor voltage component corresponding to a d-axis of the DQ coordinate system, and
   the current information includes a first current component corresponding to the q-axis of the DQ coordinate system and a second motor current component corresponding to the d-axis of the DQ coordinate system.

5. The motor controller of claim 1, wherein the first scaler converts the feedback power into the scaled feedback power by normalizing the feedback power.

6. The motor controller of claim 1, wherein the power constant controller comprises:
   a power adjuster configured to receive the scaled feedback power and convert the scaled feedback power into an estimated input power,
   wherein the power constant controller is configured to generate the first target speed based on the target power and the estimated input power.

7. The motor controller of claim 6, wherein the power constant controller comprises:
   an error generator configured to receive the target power and the estimated input power, and compare the target power and the estimated input power to generate an error signal,
   wherein the power constant controller is configured to generate the first target speed based on the error signal.

8. The motor controller of claim 7, wherein the power constant controller comprises:
   a Proportional-Integral (PI) controller configured to receive the error signal and generate the first target speed based on the error signal.

9. The motor controller of claim 6, wherein the estimated input power is representative of an input power of a power inverter coupled to an output of the current controller.

10. The motor controller of claim 1, wherein:
    the current controller is configured to measure the motor speed of the PMSM, and
    the first switch controller is configured to receive the measured motor speed and control the switching state of the first switch based on the measured motor speed.

11. The motor controller of claim 10, wherein:
    the first switch controller is configured to compare the measured motor speed to a motor speed threshold, control the first switch to be in the second switch state on a condition that the measured motor speed is less than the motor speed threshold, and control the first switch to be in the first switch state on a condition that the measured motor speed is equal to or greater than the motor speed threshold.

12. The motor controller of claim 11, wherein the second target speed is greater than first motor speed threshold and the first target speed is greater than the second target speed.

13. The motor controller of claim 1, wherein the power constant controller is configured to adjust the first target speed based on the voltage information and the current information while the PSMS is being driven in order to maintain the PMSM at the target power.

14. The motor controller of claim 1, wherein the current controller includes a first closed control loop, the speed constant controller includes a second closed control loop, and the power constant controller includes a third closed control loop.

15. The motor controller of claim 14, wherein the first closed control loop is an inner control loop, the third closed control loop is an outer control loop, and the second closed control loop is an intermediate control arranged between the first closed control loop and the third closed control loop.

16. A method of driving a permanent magnet synchronous motor (PMSM) with sensorless Field Oriented Control (FOC), the method comprising:
generating, by a current controller, control signals for driving the PMSM;
measuring, by the current controller, voltage information of the PMSM and current information of the PMSM;
generating, by a power constant controller, a first target speed based on a target power of the PMSM and based on the voltage information and the current information;
generating, by a first signal generator, a second target speed;
switchably receiving, by speed constant controller coupled between the power constant controller and the current controller, the first target speed and the second target speed;
regulating, by the speed constant controller, a motor speed of the PMSM based on the received first target speed or the received second target speed;
switchably coupling, by a first switch, the speed constant controller to the power constant controller, to receive the first target speed, in a first switch state or to the first signal generator, to receive the second target speed, in a second switch state;
controlling, by a first switch controller, a switching state of the first switch;
calculating, by the power constant controller, a feedback power of the PMSM based on the voltage information and the current information;
converting, by the power constant controller, the feedback power into a scaled feedback power;
converting, by the power constant controller, the scaled feedback power into an estimated input power;
generating, by the power constant controller, an error signal by comparing the target power and the estimated input power; and
generating, by the power constant controller, the first target speed based on the error signal.

17. The method of claim 16, wherein:
the voltage information includes a first motor voltage component corresponding to a q-axis of a DQ coordinate system and a second motor voltage component corresponding to a d-axis of the DQ coordinate system, and
the current information includes a first current component corresponding to the q-axis of the DQ coordinate system and a second motor current component corresponding to the d-axis of the DQ coordinate system.

18. The method of claim 16, further comprising:
measuring, by the current controller, the motor speed of the PMSM; and
controlling, by the first switch controller, the switching state of the first switch based on the measured motor speed.

19. The method of claim 18, further comprising:
comparing, by the first switch controller, the measured motor speed to a motor speed threshold;
controlling, by the first switch controller, the first switch to be in the second switch state on a condition that the measured motor speed is less than the motor speed threshold; and
controlling, by the first switch controller, the first switch to be in the first switch state on a condition that the measured motor speed is equal to or greater than the motor speed threshold.

20. The method of claim 19, wherein the second target speed is greater than first motor speed threshold and the first target speed is greater than the second target speed.

* * * * *